United States Patent
Tuchow

(10) Patent No.: US 7,451,458 B2
(45) Date of Patent: Nov. 11, 2008

(54) SOFTWARE METHODS OF AN OPTICAL NETWORKING APPARATUS WITH MULTIPLE MULTI-PROTOCOL OPTICAL NETWORKING MODULES HAVING PACKET FILTERING RESOURCES

(76) Inventor: Jonathan A. Tuchow, 5470 NW. 196th Pl., Portland, OR (US) 97229

( * ) Notice: Subject to any disclaimer, the term of this patent is extended or adjusted under 35 U.S.C. 154(b) by 715 days.

(21) Appl. No.: 10/211,158

(22) Filed: Aug. 2, 2002

(65) Prior Publication Data
US 2004/0022259 A1 Feb. 5, 2004

(51) Int. Cl.
*G06F 3/00* (2006.01)
(52) U.S. Cl. ....................................... 719/328
(58) Field of Classification Search ................. 719/328, 719/310, 321
See application file for complete search history.

(56) References Cited

U.S. PATENT DOCUMENTS

| | | | | |
|---|---|---|---|---|
| 5,574,903 A | * | 11/1996 | Szymanski et al. | 707/1 |
| 5,615,400 A | * | 3/1997 | Cowsar et al. | 719/332 |
| 6,044,415 A | * | 3/2000 | Futral et al. | 710/33 |
| 6,567,413 B1 | | 5/2003 | Denton et al. | |
| 6,850,978 B2 | * | 2/2005 | Springmeyer et al. | 709/224 |
| 7,002,967 B2 | | 2/2006 | Denton et al. | |
| 2002/0049930 A1 | * | 4/2002 | Hannigan | 714/39 |

* cited by examiner

*Primary Examiner*—Meng-Ai An
*Assistant Examiner*—Lechi Truong
(74) *Attorney, Agent, or Firm*—Schwabe, Williamson & Wyatt, P.C.

(57) ABSTRACT

An API is provided to an optical networking apparatus to facilitate uniform access, control and interaction with its multi-protocol optical networking modules (MPONM) by its applications. Each of the MPONM has a number of function blocks having corresponding drivers. In response to an application's request to initialize a MPONM, the initialization function of the API cooperates with the function block drivers to create a data structure for the MPONM, and returns a handle of the data structure to the application. Thereafter, in response to a need to have an operation performed in the packet filtering function block of a MPONM, the application makes the request to the API, including with the request the handle of the data structure of the MPONM. In response, the API allocates a packet filtering resource to perform the operation, and returns a handle corresponding to the allocated resource to the application for use in further requests. When the application is finished with the resource, the resource is de-allocated by the API.

20 Claims, 13 Drawing Sheets

SOFTWARE METHODS OF AN OPTICAL NETWORKING APPARATUS WITH MULTIPLE MULTI-PROTOCOL OPTICAL NETWORKING MODULES HAVING PACKET FILTERING RESOURCES

FIELD OF THE INVENTION

The present invention relates to software methods and networking apparatuses. More specifically, the present invention relates to software methods to provide uniform access, control and/or interaction with packet filtering resources of multi-protocol network processors of multi-protocol optical networking modules (MPONM) in an optical networking apparatus.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

Because of this trend of increased connectivity, an increasing number of applications that are network dependent are being deployed. Examples of these network dependent applications include but are not limited to, the World Wide Web, email, Internet based telephony, and various types of e-commerce and enterprise applications. The success of many content/service providers as well as commerce sites depend on high-speed delivery of a large volume of data across wide areas. As a result, high-speed data trafficking devices, such as high-speed optical, or optical-electro routers, switches and so forth, are needed.

Unfortunately, because of the multiplicity of protocols, including datacom and telecom protocols, that may be employed to traffic data in the various types of networks, designers and developers of networking components and equipments, such as line cards, routers and switchers, have to wrestle with a multitude of prior art protocol processors. Each of these protocol processors is typically dedicated to the support of either local/regional or regional/wide area protocols, in their design of these components/equipments. This burden is costly, and slows down the advancement of high-speed networks.

U.S. patent application Ser. Nos. 091860,207 (now U.S. Pat. No. 7,002,967) and 09/861,002 (now U.S. Pat. No. 6,567,413), both filed on May 18, 2001, entitled "A MULTI-PROTOCOL NETWORKING PROCESSOR WITH DATA TRAFFIC SUPPORT SPANNING LOCAL, REGIONAL AND WIDE AREA", and "AN OPTICAL NETWORKING MODULE INCLUDING PROTOCOL PROCESSING AND UNIFIED SOFTWARE CONTROL" respectively, disclosed a novel highly flexible multi-protocol network processor capable of supporting high-speed data traffic in local, regional, and wide area networks, and a multI-protocol optical networking module that can be constructed from such a multi-protocol network processor. Resultantly, sophisticated optical-electrical networking apparatuses such as optical-electrical routers and switches may be built more efficiently with multiple ones of the disclosed multi-protocol optical networking module (each having its own multi-protocol network processor).

In turn, the task for developing networking applications for such sophisticated optical-electrical networking apparatus with multiple ones of the disclosed multi-protocol optical networking module (each having its own multi-protocol network processor) have become much more difficult. Accordingly, a software architecture, including methods, that reduces the complexity and improves the ease for developing networking applications for such complex networking apparatuses with multiple ones of the disclosed multi-protocol optical networking module (each having its own integrated multi-protocol network processor) is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Figure 1:
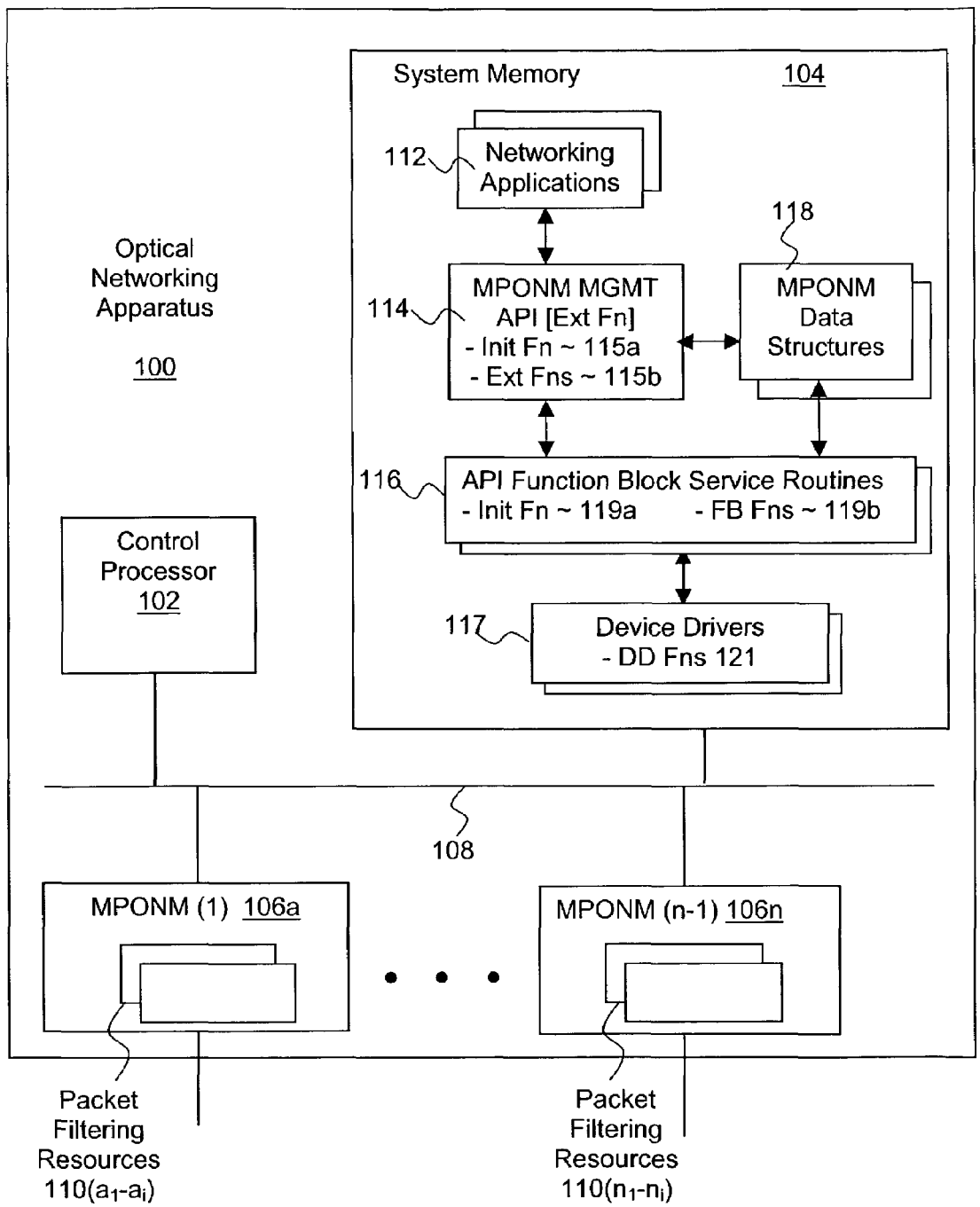
FIG. 1 illustrates an overview of the software method of the present invention, including an optical-electrical networking apparatus having multiple MPONM (each integrated with a multi-protocol network processor and multiple filtering resources), within which the present invention may be practiced, in accordance with one embodiment.

The present invention includes software methods, in particular, an application programming interface (API) for networking applications to interact with filtering resources including one or more lookup tables or content addressable memories, and filtering logic of multi-protocol network processors (MPONM) of an optical-electrical networking apparatus.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will be described using networking terms, including but not limited to:

| | |
|---|---|
| Egress | Outgoing data path from the system to the network |
| Ingress | Incoming data path from the network to the system |
| IP | Internet Protocol |
| LAN | Local Area Network |
| MAC | Media Access Control layer, defined for Ethernet systems |
| POS | Packet over SONET |
| PPP | Point to Point Protocol |
| SONET | Synchronous Optical network, a PHY telecommunication protocol |
| VLAN | Virtual Local Area Network |
| WAN | Wide Area Network |

The terms "provide" and "providing", and other terms of the like, as used in this specification and in the claims, include indirect as well as direct provision of the object of the provision operation. That is, an entity A may "provide" another entity B with an item C (the object of the provision operation) directly, or indirectly by providing entity B with information to obtain the object item C, such as a pointer to a location from which the object item C may be obtained.

Section Headings, Order of Descriptions and Embodiments

Section headings are merely employed to improve readability, and they are not to be construed to restrict or narrow the present invention.

Various operations will be described as multiple discrete steps in turn, in a manner most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

Overview

Referring now to FIG. 1, wherein a block diagram illustrating one embodiment of an optical-electrical networking apparatus having multiple MPONM within which the present invention may be practiced, is shown. As illustrated, for the embodiment, optical networking apparatus 100 includes a number of MPONM 106a-106n, a control processor 102, and memory 104, coupled to each other through system bus 108.

In various embodiments, the various MPONM 106a-106n may be connected to system bus 108 in like or different manners. For example, all MPONM 106a-106n may be connected via corresponding parallel interfaces, or some MPONM 106* may be connected via corresponding serial interfaces, while others are connected via corresponding parallel or other bus interfaces. Accordingly, for the embodiment, various device drivers 117 having functions 121 are provided to facilitate the various corresponding types of interfaces for connecting MPONM 106a-106n to system bus 108. That is, a serial interface oriented device driver 117 is provided to facilitate connection of some or all of MPONM 106a-106n via corresponding serial interfaces, a parallel interface oriented device driver 117 is provided to facilitate connection of some or all of MPONM 106a-106n via corresponding parallel interfaces, and so forth.

Each of MPONM 106a-106n includes at least one multi-protocol network processor having a number of function blocks, as e.g. described in further detail below as well as in the above-identified co-pending U.S. patent applications. The various function blocks are selectively employed in combination to service data transmission and receipt in accordance with a selected one of a number of frame based protocols, including frame based protocols encapsulated within a synchronous protocol, as well as streaming and packet variants of the synchronous protocol. These protocols include at least one each of a datacom and a telecom protocol.

In one embodiment, the function blocks include a system interface block, a network interface block, a MAC block, an Ethernet 64/64 coder, an Ethernet on SONET coder block, a PPP protocol and HDLC processor block, a HDLC Packet over SONET coder block, a SONET path processor block, a SONET section and line processor block, a packet filtering block and a control interface. In accordance with one embodiment of the invention, MPONM 106a-106n are each equipped with a plurality of packet filtering resources ($110_{a1-at}$-$110_{n1-ni}$) including one or more packet filters and one or more lookup tables/CAMS to determine the disposition (e.g. drop, pass, divert) of ingress traffic.

Thus, it should be appreciated that without the teachings of the present invention, if networking applications 112 are required to access, control or otherwise interact with multiple function blocks of multiple network processors on multiple MPONM directly, the complexity may become unmanageable if not prohibitive for the average software developer. This is especially true in view of the multiplicity of network processors and MPONM present in each optical networking apparatus 100, and the different manners the MPONM 106* may be connected, not to mention the multiplicity of programmable packet filtering resources as well as other function-specific components provided by each MPONM.

Accordingly, under the present invention, MPONM API 114 and function block service routines 116 are provided for interfacing with the function blocks of the network processors of the MPONM, to insulate the complexity of the function blocks of the network processors of the MPONM from networking applications 112. In particular, for the embodiment, MPONM API 114 includes at least an externalized module initialization function 115a and a number of externalized functions 115b associated with corresponding function blocks, provided to further streamline the interactions between networking applications 112 and MPONM function block service routines 116. Examples of externalized functions 115b include but are not limited to externalized functions correspondingly associated with controlling the operations of the MAC, SONET, and other function blocks.

In various embodiments, a number of externalized cross function block functions (not shown) may also be provided as part of MPONM API 114. An example of such functions is a configuration function to set the various configurable parameters of the function blocks. The term "externalized" is used in the current context from the visibility perspective of networking applications 112 for ease of understanding. The characterization has no significance as to the essence of the present invention.

As will be described in more detail below, MPONM API 114 buffers networking applications 112 in accessing, controlling, or otherwise interacting with a MPONM through MPONM function block service routines 116 using MPONM data structures 118, one for each MPONM 106*. [The asterisk at the end of a reference number denotes a "wild card", representing any of the trailing suffixes of the reference numbers employed in a figure. For example, 106* stands for 106a, 106b or any one of the other 106 references of FIG. 1.]

Except for MPONM API 114, including the initialization and externalized functions, the teachings of the present invention incorporated with function block service routines 116, and the manner in which networking applications 112 and function block service routines 116 cooperate with MPONM API 114, networking applications 112 and function block service routines 116 otherwise represent a broad range of such elements known in the art, and are typically application dependent. Accordingly, except for the manner networking applications 112 and function block service routines 116 cooperate with MPONM API 114, the two elements will not be otherwise further described.

Networking Applications

Figure 2A:
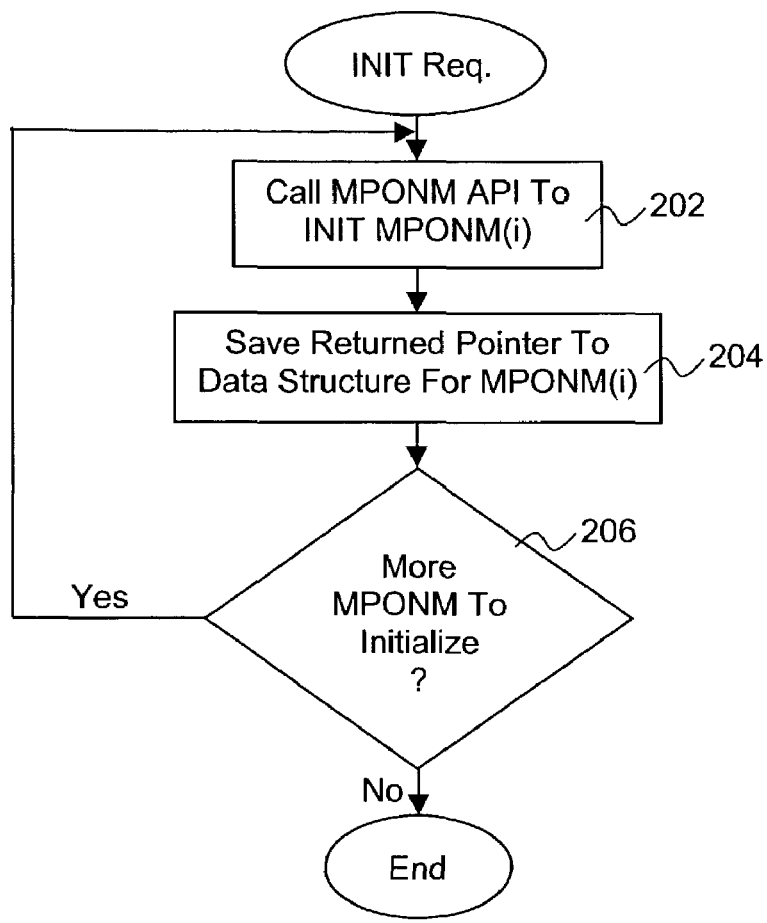
FIGS. 2a-2b illustrate the operational flow of aspects of a networking application of FIG. 1 interacting with the MPONM API of the present invention, to access, control and/or otherwise interact with the function blocks of the multi-protocol network processor of the MPONM, in accordance with one embodiment.
Figure 2B:
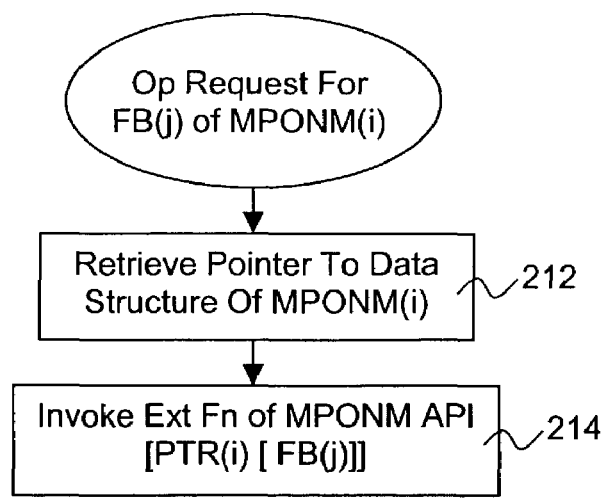

FIGS. 2a-2b illustrate aspects of an operating flow of networking applications 112 for practicing the present invention, in accordance with one embodiment. As illustrated in FIG. 2a, under the present invention, i.e. with the provision of MPONM API 114 including an externalized module initialization function 115a, at initialization or a subsequent point in time at the desire of a networking application 112, the networking application 112 invokes the module initialization function 115a of MPONM API 114 to initialize a desired MPONM 106 for subsequent access, control or interaction by networking applications 112, block 202.

In one embodiment, networking application 112 identifies the particular MPONM 106* by providing the "handle" of the device driver 117 handling the connecting interface through which the particular MPONM 106* is connected to bus 108, and if applicable, information (such as memory mapped addresses, port numbers and so forth) associated with how the particular MPONM 106* is mapped on the connecting interface.

As will be described in more detail below, in response, the module initialization function 115a of MPONM API 114, in conjunction with the function block service routines 116 (more specifically, init function 119a of the function block service routines 116), advantageously creates an instance of a MPONM data structure 118 for the corresponding MPONM 106* to be initialized (if the module data structure 118 has not been previously created for the corresponding MPONM 106*) to facilitate subsequent access, control and/or interaction with the corresponding MPONM 106* by networking applications 112. As part of the process, a handle of the module data structure 118 for the corresponding MPONM 106* is returned to the invoking one of networking applications 112. More specifically, in one embodiment, the "handle" is a pointer to the corresponding module data structure 118 of the initialized MPONM 106*.

Thus, as illustrated, networking application 112 saves the returned handle (or pointer) to the module data structure 118 for the MPONM 106 upon receipt of the handle (or pointer) from the module initialization function of MPONM API 114. Thereafter, networking application 112 determines if another MPONM 106 is to be initialized, block 206. If so, operations 202-204 are repeated; Otherwise the initialization process for networking application 112 proceeds to completion.

In other embodiments, a module initialization function 115a may support each initialization request requesting initialization of one or more desired MPONM 106* instead. For these embodiments, more than one desired MPONM 106* may be specified in a single request, with the request returning multiple corresponding handles (or pointers) for the successfully initialized ones of the requested MPONM 106*.

As illustrated in FIG. 2b, upon having a need to request a service or having an operation performed in a function block of a MPONM 106*, networking application 112 retrieves the handle (or pointer) to the module data structure 118 of the MPONM 106*, block 212, and then formats, and submits the request to an externalized function 115b of MPONM API 114, block 214. In the illustrated embodiment, some requests (e.g. requests associated with invoking cross function block externalized functions) may include identifications of the function blocks within which the requested operations are to be performed. However, whether through association of the invoked externalized function or identification, the identification of the function block is not particularized to a MPONM 106*; nor is an identification of the MPONM 106* provided. Instead, the MPONM 106* within which the identified function block the requested operation is to be performed is implicitly identified. More specifically, the handle (or pointer) of the corresponding module data structure 118 of the MPONM 106 is provided by networking application 112 in its request.

In one embodiment of the invention, an identification of the function block within which the requested operation is to be performed is provided to MPONM API 114 in conjunction with only the initial request for that function block. In response to an initial request directed to a given function block of a MPONM 106*, MPONM API 114 returns a handle that implicitly identifies the function block for simplified subsequent access by networking applications 112. In one embodiment, each subsequent request by networking applications 112 includes a first handle implicitly identifying a MPONM 106* that contains a function block to be accessed, and a second handle implicitly identifying the function block to be accessed and/or one or more resources associated therewith. For example, a request by networking applications 112 might include a first handle implicitly identifying a MPONM 106*, as well as a second handle implicitly identifying a filter resource (such as a content addressable memory) located within a packet filter function block of the MPONM 106* corresponding to the first handle. More specifically, the identification of the filter resource is not particularized to a MPONM 106*; nor is an identification of the MPONM 106* or filter resource provided. In one embodiment, the function block handle represents a pointer to a pointer of the module data structure 118 of the MPONM 106*, whereas in other embodiments the function block handle may represent a pointer to a separate module data structure 118 than that of the MPONM 106*.

The implicit reference through the handle or pointer of the module data structure 118 of the MPONM 106* of interest, as well as the implicit reference by the secondary (and possibly subsequent) handle(s) or pointer(s) of the function block and/ or resource within a function block to be accessed, improves the ease of use for the software developers of networking applications, who are more familiar with handles/pointers, as opposed to having to be cognizant of specific hardware modules and hardware details, including the details of the connection interfaces through which the MPONM 106* are correspondingly connected. This is especially true where the developers are required to reference multiple hardware modules each having a multiplicity of function blocks often times containing a multiplicity of shared resources including but not limited to packet filtering resources.

Thus, in accordance with one embodiment of the invention, one or more networking applications 112 can dynamically allocate, access, and release individual packet filtering resources using one or more secondary handles implicitly identifying the associated resource, without the need for the developer to have specific knowledge of the hardware/software configuration or resource availability.

Module Data Structure

Figure 3:
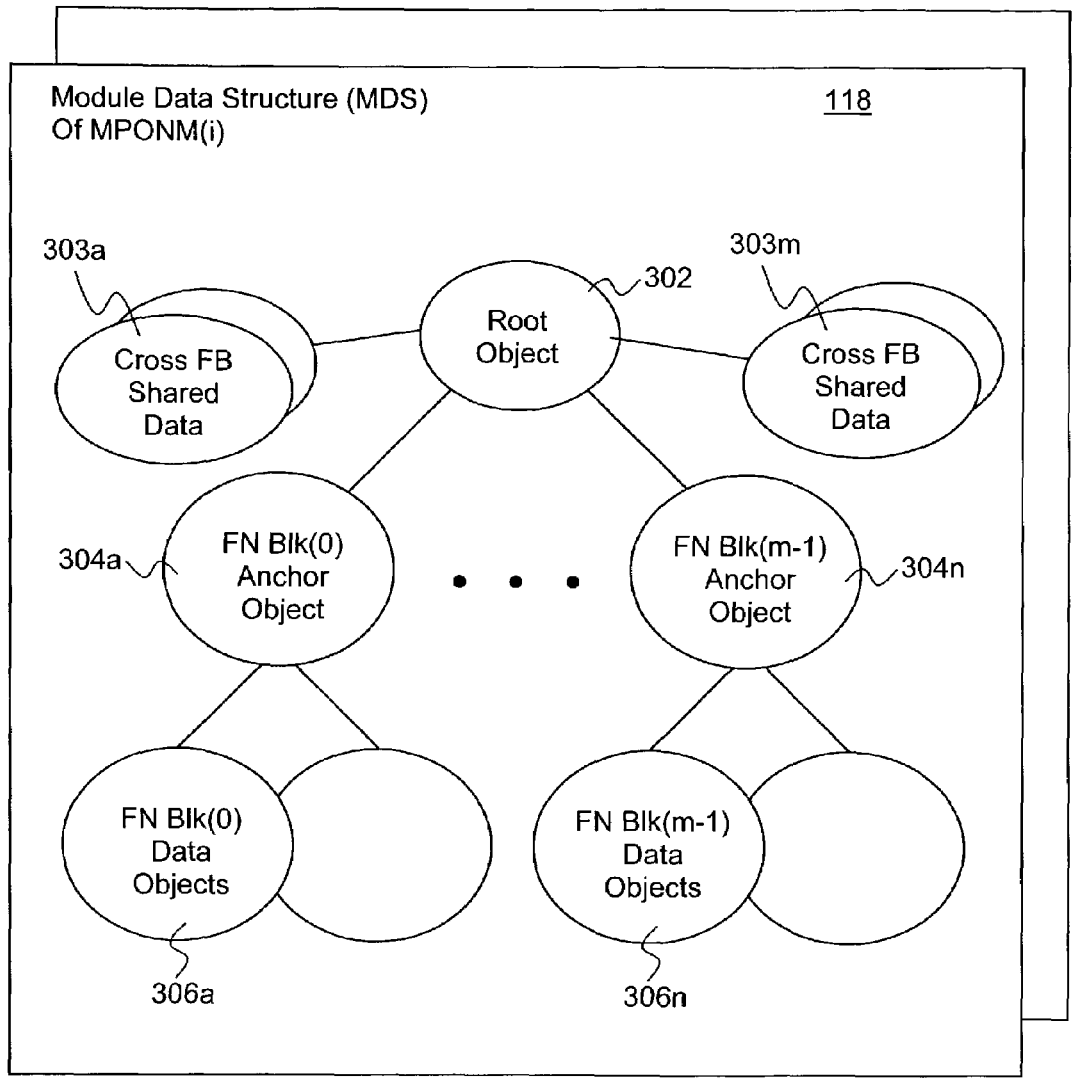
FIG. 3 illustrates the corresponding module data structures of a MPONM, employed to practice the present invention, in further detail, in accordance with one embodiment.

FIG. 3 illustrates an exemplary data organization suitable for use to store various module-related data to practice the present invention, in accordance with one embodiment. As illustrated, for the embodiment, module data structures 118 employed to facilitate the practice of the present invention are implemented in an object-oriented manner. As described earlier, one module data structure 118 is employed for each MPONM 106.

As illustrated, each module data structure 118 includes a root object 302 and cross function block objects 303* having cross function block shared data variables. Examples of data included in cross function block objects 303* include but are not limited to data and/or pointers employed in interacting with the appropriate device driver 117 for the particular MPONM 106*.

Additionally, each module data structure 118 includes a number of "anchor" data objects 304*, one each for the function blocks supported. "Anchor" data objects 304* may include a number of function block specific control data variables. Examples of such function block specific control data variables include status variables denoting e.g. whether the corresponding function block service routine 116 was successful in performing certain requested operations.

Further, attached with each "anchor" data objects 304* of the function blocks, are function block specific data objects 306a, having function block specific operational data variables. Examples of such function block specific operational data variables include bit masks, filter criteria, comparison bit patterns, and so forth. In other embodiments, the present invention may be practiced using other data organizations.

Module Initialization Functions

Figure 4:
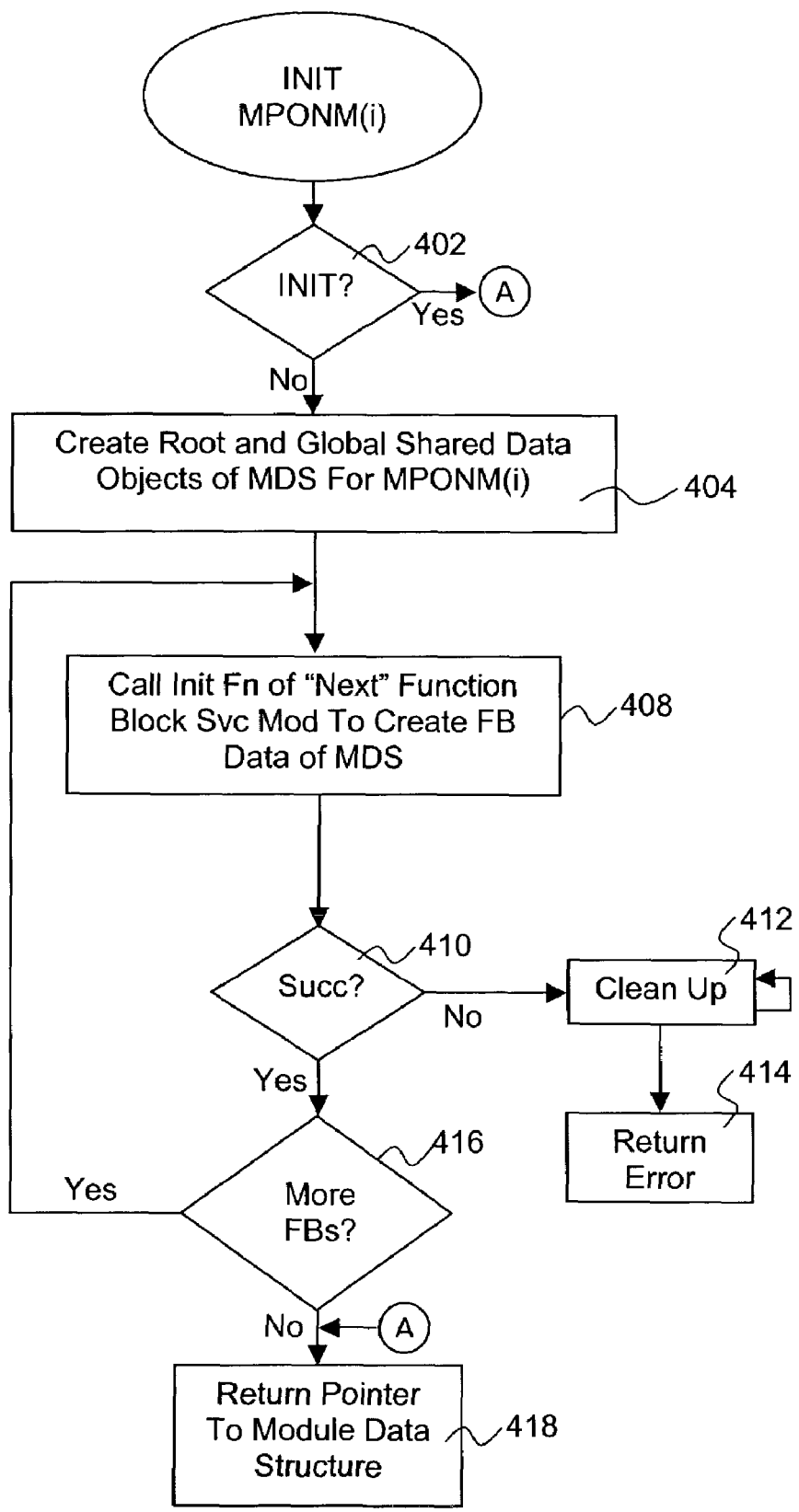
FIG. 4 illustrates an example operating flow of aspects of a module initialization function of the MPONM API of the present invention, in accordance with one embodiment.

FIG. 4 illustrates the operating flow of aspects of the module initialization functions 115a of MPONM API 114 for practicing the present invention, in accordance with one embodiment.

As illustrated for the embodiment, upon receipt of a request to initialize a MPONM 106*, initialization function 115a of MPONM API 114 determines if the MPONM 106* has previously been initialized, block 402. More specifically, initialization function 115a determines whether the corresponding module data structure 118 of the MPONM 106* has previously been created or not (e.g. as a result of responding to another initialization request for the same MPONM 106 by the same or another networking application 112). If so, the module initialization function 115a returns the handler/ pointer of the corresponding module data structure 118 of the MPONM 106, block 418.

Otherwise, i.e. if the module data structure 118 has not been previously created before, initialization function 115a creates the root and cross function block objects 302-303* of the module data structure 118 of the MPONM 106, block 404.

Thereafter, initialization function 115a successively calls the initialization functions 119a of the corresponding function block service routines 116 of the function blocks to contribute to the creation of data structure 118 to facilitate subsequent access, control or interaction with MPONM 106* by networking applications 112, block 408. In response, each of the initialization functions 119a of the corresponding function block service routines 116 creates the corresponding anchor and descendent data objects 304*-306* for the corresponding function block of the MPONM 106*, block 408.

For the embodiment, after each invocation, initialization function 115a further determines whether the contributory creation expected of the invoked initialization function 119a of the function block driver is successful, block 410. If an error is returned for the contributory creation, initialization function 115a successively undoes all prior successful additions to the module data structure 118, block 412, and initialization function 115a returns an error notice to the network application 112, block 414.

If the contributory creation was determined to be successful at block 410, the module initialization function further determines if more initialization functions 119a of additional function block service routines 116 are to be invoked, block 416. If at least one initialization function 119a of an additional function block service routine 116 is to be invoked, initialization function 115a continues operation at block 408 as earlier described. If not, the cooperative creation initialization process is completed, and initialization function 115a returns the handle/pointer of the module data structure 118 of MPONM 106* as earlier described, block 418.

In various embodiments, successive invocation of the initialization functions 119a of the function block service routines 116 to contribute to the creation of the module data structure 118 may be made in a predetermined order, to address certain application dependencies, such as data dependencies between data of the different function blocks.

Invocation of Externalized Functions

Operationally, as described earlier, upon having a need to have an operation performed within a function block (of a MPONM 106*), networking application 112 requests an appropriate externalized function 115b accordingly.

Typically, the same externalized function 115b is invoked for the same function block of different MPONM 106*. Moreover, the request does not explicitly identify the MPONM 106*, only the module data structure 118 of the MPONM 106*. Nevertheless, the invoked externalized function of the MPONM API 114 processes the request and interacts with the appropriate functions 119a of the appropriate function block service routines 116 to operate on the appropriate function block of the appropriate MPONM 106* accordingly. Resultantly, accessing, controlling or otherwise interacting with MPONM 106* by networking applications 112 is streamlined.

Note that as alluded to earlier, the exact manner an initialization function 119a of a function block service routine 116 contributes in the creation of the module data structure of a MPONM 106*, i.e. the kind of data variables the function block service routine 116 adds to, maintain, or otherwise manipulate, using module data structure 118 is application dependent. Similarly, the nature and the manner in which the various functions 119b of the function block service routine 116 interacts with the corresponding function blocks of MPONM 106*, are also application dependent. These issues vary from function blocks to function blocks.

Packet Filtering Function Block

The MPONM API of the present invention provides a set of externalized software-based functions for managing linespeed packet filtering capabilities of an optical networking apparatus, such as optical networking apparatus 100 of FIG. 1. In accordance with one embodiment of the invention, the optical networking apparatus can be used to filter ingress traffic based on a range of bytes in each packet. For POS flows for example, the range includes but is not necessarily limited to the IP source address, IP destination address, ToS, packet length, packet ID, and protocol value, as well as fragment information. For Ethernet (e.g. MAC) flows, the range includes the MAC source address, MAC destination address, VLAN ID, and type/length field.

Packets matching specified filter conditions may be removed from the data stream or passed e.g. into a parallel interface depending upon a developer-defined configuration e.g. as implemented via the MPONM API of the present invention. Packets removed from the data stream may be dropped entirely, or diverted (e.g. via an ingress packet buffer) to a processor control interface for software analysis for example. The MPONM API of the present invention facilitates the creation of logical address groups, the addition and deletion of addresses from each group, the creation of filtering rules, and the addition of groups to a rule among other functionalities. Moreover, the MPONM API automates the management of groups, tables, and rules including, but not limited to table initialization, table entry assignment, filter function definition, and filter priority management.

Figure 5:
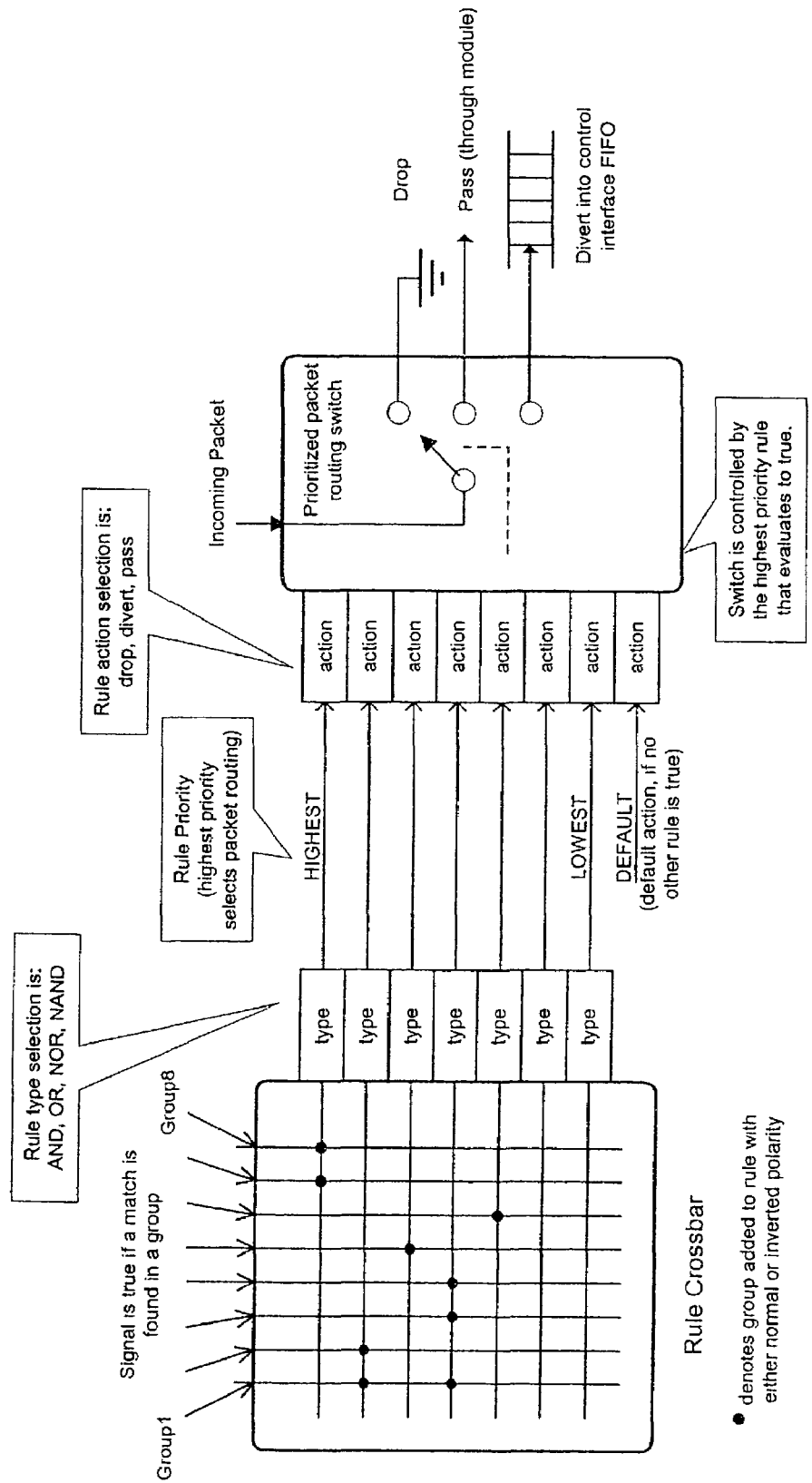
FIG. 5 illustrates a logical view of packet filter rule configurations in accordance with one embodiment of the invention.

Reference is now drawn to FIG. 5 where a logical overview of packet filter rule configurations in accordance with one embodiment of the invention is shown. In FIG. 5, a rule crossbar indicating rule/group memberships is illustrated. As shown, the horizontal lines within the crossbar represent rules, whereas the vertical lines within the crossbar represent groups. A 'dot' appearing at the intersection of a group line and a rule line indicates that the corresponding group is a member of the corresponding rule.

Each rule is associated with a Boolean rule type including an AND rule, an OR rule, a NOR rule or a NAND rule. Furthermore, each rule is associated with a discrete priority ranging from 'highest' to 'lowest', and a preprogrammed action to be taken upon a match occurring between an incoming packet and the corresponding rule. In one embodiment, if an incoming packet matches more than one rule (i.e. more than one rule evaluates to true), the matching rule associated with the highest priority dictates the action to be taken. In the illustrated embodiment, possible actions include 'drop', 'divert', and 'pass'. Moreover, if no rules evaluate to true, an action associated with a default rule is taken In one embodiment of the invention, the filter configuration is built on a set of eight search tables consisting of 256 entries each, and seven programmable filters, which operate based upon assigned priorities. In one embodiment, these search tables are independently configurable for searching on byte fields within packets. In one embodiment, the search tables can be configured to search on contiguous eight-byte fields within the first 24 bytes of each packet. In one embodiment, each search table is implemented as a content addressable memory (CAM), however the invention is not limited to such an implementation.

For both IP and MAC packets, the MPONM API of the present invention causes portions of the packet header fields to be masked before they are compared to groups created by the developer via the MPONM API. In one embodiment, comparison result outputs from each group are combined using logical operations and fed to a bank of prioritized filters which determine whether a packet should be dropped, allowed to pass through to the system interface, or diverted to a microprocessor such as control processor 102 of FIG. 1.

Figure 6:
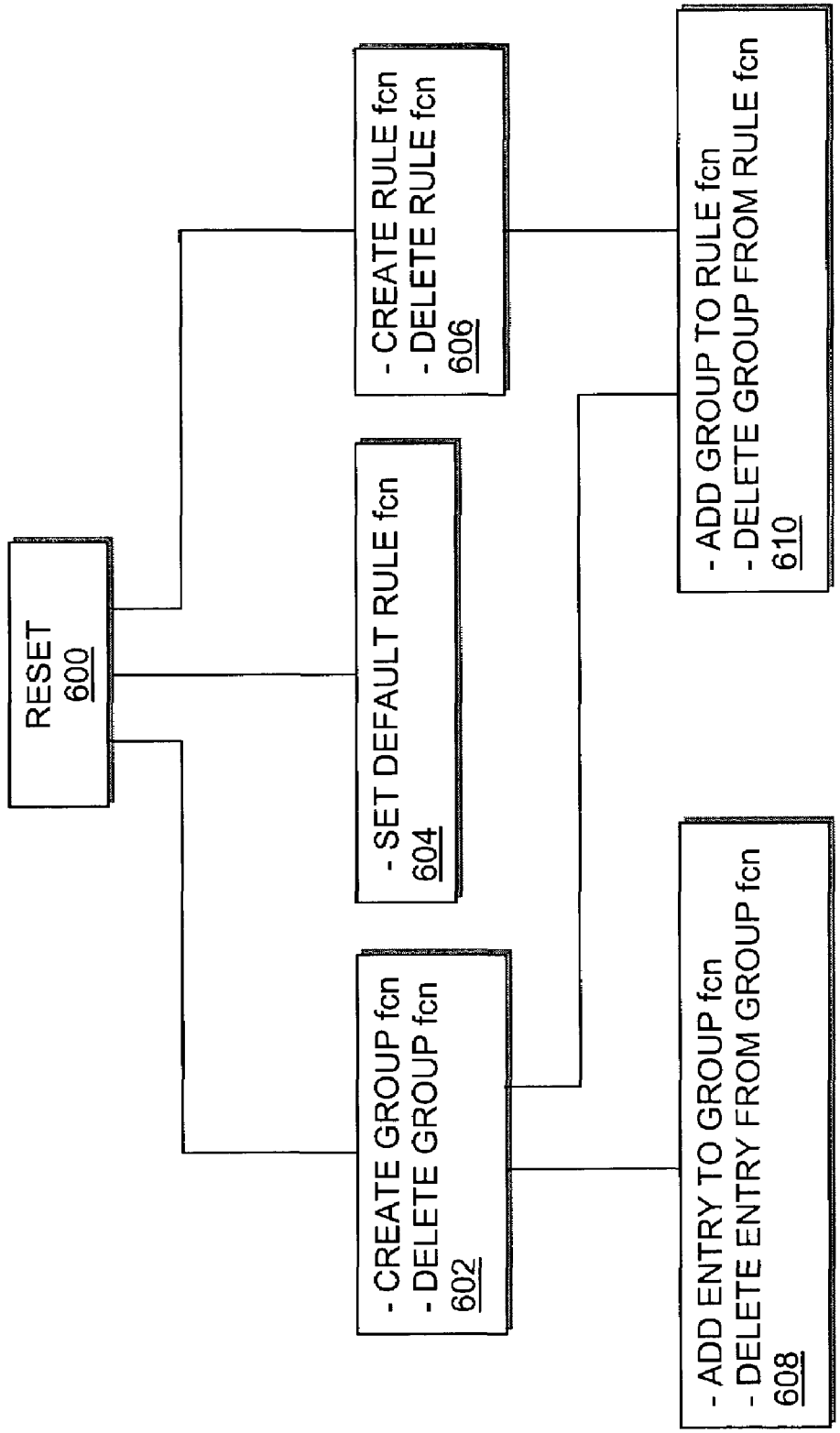
FIG. 6 illustrates dependencies between various MPONM API packet filter functions for configuring packet filtering resources in accordance with one embodiment of the present invention.

FIG. 6 illustrates dependencies between various MPONM API packet filter functions for configuring packet filtering resources in accordance with one embodiment of the present invention. To start, the packet filter is typically reset to place the packet filter components in a known state (block 600). Thereafter, any of a number of functions could be invoked depending e.g. upon the desire of a developer and/or state of a corresponding networking application. For example, after reset, one or more filter groups could be created/deleted (block 602), one or more rules could be created/deleted (block 606), or the default rule could be set (block 604). During the creation of the group, one or more packet filtering resources are identified and allocated by the MPONM API to store comparison patterns associated with the group. Once a group has been created (block 602), one or more search patterns (referred to herein as entries or pattern entries) can be added/deleted to/from the group (block 608).

Furthermore, once a group has been created (block 602) and at least one rule (e.g. indicating whether a given ingress packet should be allowed to pass, be diverted, or be dropped) has been created (block 606), the preexisting group may be added to (i.e. associated with) the one or more preexisting rules (block 610). Likewise, a preexisting group could also be deleted from one or more preexisting rules (block 610). In accordance with the illustrated embodiment, other than the dependencies shown in FIG. 6, the MPONM API functions may generally be invoked in any order.

Group Creation

Packet filter groups are collections of patterns that are matched against user-defined fields of an incoming packet header. In one embodiment, a developer creates a group by supplying the field of the incoming packet that is to be compared with entries in the filter group (e.g. source MAC address). The developer may also create an additional mask for the supplied field (e.g. to examine only source IP network by prefix bytes). Multiple filter groups may be created to simultaneously examine different fields of the same incoming packet. For example, a 'group A' may compare the source address of an incoming packet with its respective entries, while a 'group B' compares a destination address of an incoming packet with its respective entries.

Figure 7:
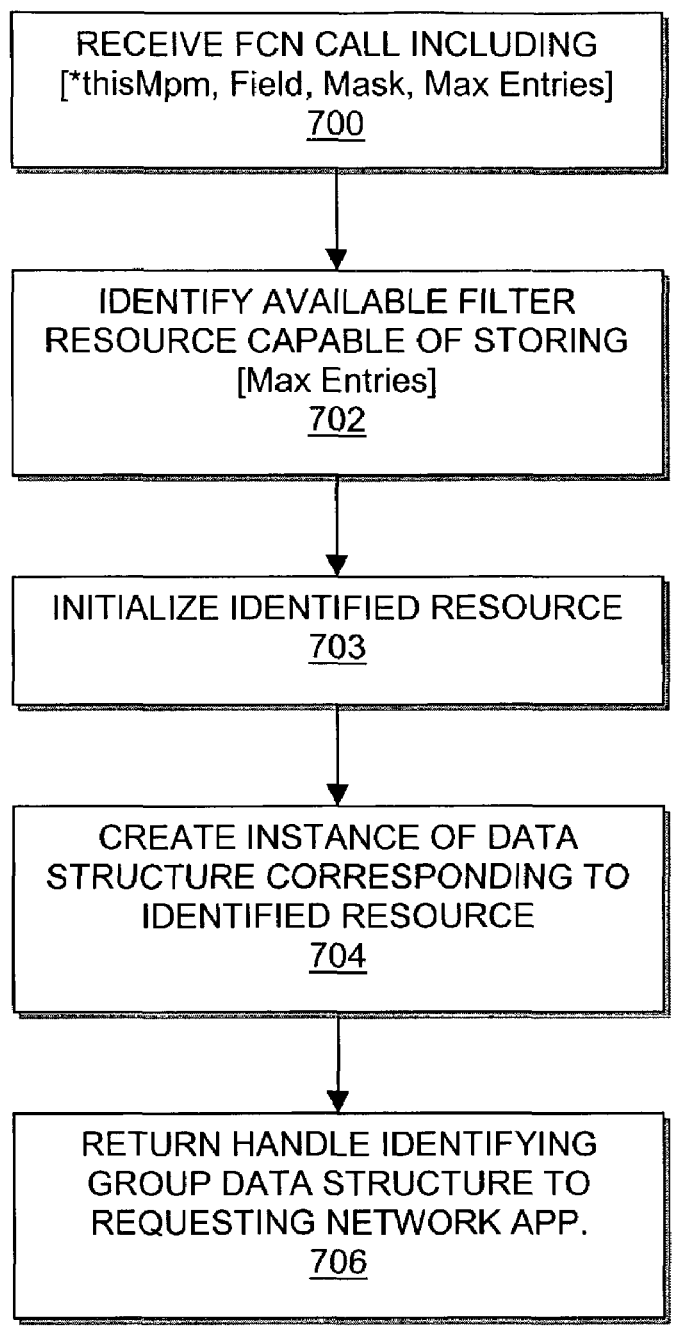
FIG. 7 illustrates an MPONM API operational flow for creating a packet filtering group in accordance with one embodiment of the invention.

FIG. 7 illustrates an MPONM API operational flow for creating a packet filtering group in accordance with one embodiment of the invention. As illustrated, the process begins with the MPONM API receiving a function call including '*thisMpm', 'Field', 'Mask' and 'MaxEntries' parameters (block 700). The *thisMpm parameter represents a pointer to a data structure representing a particular MPONM upon which the filter group is to be created, and the Field parameter indicates the field(s) to be examined within an ingress packet. As described above, the fields eligible to be examined include source/destination addresses for both MAC and POS packets, VLAN addresses, and so forth. The Mask parameter specifies a mask to be applied to the indicated field(s), while MaxEntries specifies the maximum number of entries allowed to be associated with the corresponding group.

Once the MPONM API has identified a particular MPONM upon which the group is to be created, the MPONM API determines which of the packet filtering resources of the identified MPONM are available for allocation to the group (i.e. allocated to store patterns associated with the group) (block 702). In one embodiment, the MPONM API identifies an available filtering resource based upon the resource's ability to store up to a number of patterns equivalent to 'MaxEntries'. The identified filter resource is then initialized through e.g. automatic population of unique entries as described further below (block 703). Once a filtering resource has been allocated and initialized, a data structure corresponding to the identified filtering resource is instantiated (block 704), and a group handle 'Gnum' implicitly identifying the allocated resource is returned to the requesting network application by the MPONM API (block 706). In one embodiment, the group handle is a numeric identifier that is unique across all packet filtering groups. Accordingly, an MPONM API function call designed to create a group to examine the destination address of an Ethernet packet, mask certain nybbles using mask 0xffdf, and allow a maximum of 256 entries might be formed as "CreateGroup (thisMpm, PF_MAC_DA, 0xffdf, 256, &gnum)".

In addition to providing a function to create a packet filtering group, the MPONM API further includes a function to delete a previously created group. In one embodiment, the DeleteGroup function takes as parameters the module handle as well as the handle assigned to the group during the group creation phase.

Initialization

As alluded to above, when a group is created, its corresponding search tables are automatically populated with unique entries. In one embodiment, the uniqueness of the entries is maintained by the MPONM API throughout its operation. In one embodiment, search table entries are unique with respect to the ingress packet field(s) (e.g. indicated during group creation) against which patterns are to be compared.

Figure 8:
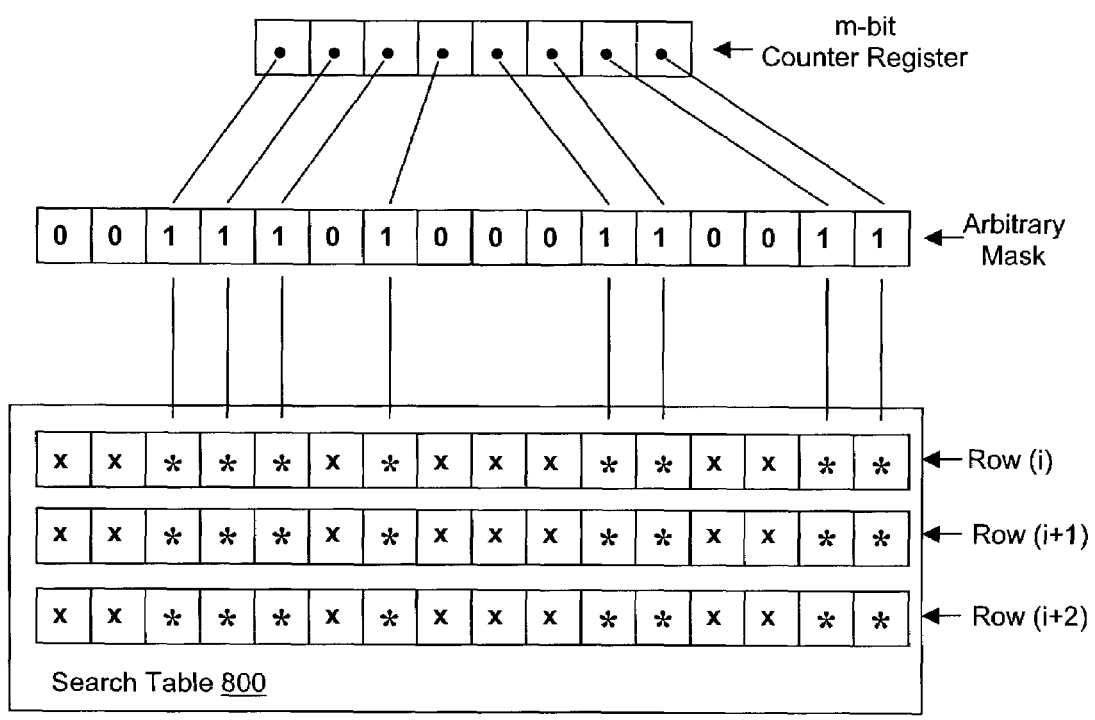
FIG. 8 illustrates one embodiment of logic used to generate unique search table entries through bit dispersion of a counter for an arbitrary masking of valid bits.

FIG. 8 illustrates one embodiment of logic used to generate unique search table entries through bit dispersion of a counter for an arbitrary masking of valid bits. As shown, an m-bit counter register is coupled to an arbitrary bit/nybble mask, which in turn is coupled to search table/CAM 800 containing M unique pattern storage locations. Accordingly, the bit representation stored in the counter register is dispersed among the currently addressed row of search table/CAM 800, based upon the settings of the arbitrary bit mask. For example, in the illustrated embodiment a bit value of '1' (i.e. representing an include bit) located in the first bit position of the mask register will cause a bit value within the counter register to be copied to a first bit position within the currently addressed row of search table. However, a bit value of '0' (i.e. representing an exclude bit) located in the first bit position of the mask register will cause a "don't care" value to be stored in the first bit position within the currently addressed row of search table/CAM 800. In one embodiment, counter register bit values need not be copied to locations within search table/CAM 800 corresponding to their bit positions within the counter register. For example, the value corresponding to bit 0 of the counter register may be copied to bit position 2 of search table/CAM 800 and the value corresponding to bit 1 of the counter register may be copied to bit position 5 of search table/CAM 800. After an entry has been generated for one row of search table/CAM 800, the counter is incremented and the next sequential location within search table 800 is filled.

Pattern Entries

When a group is initially created, there are no patterns associated with the group by default. After a group is created, pattern entries may be added to the group using one or more function calls to the MPONM API of the present invention.

Figure 9A:
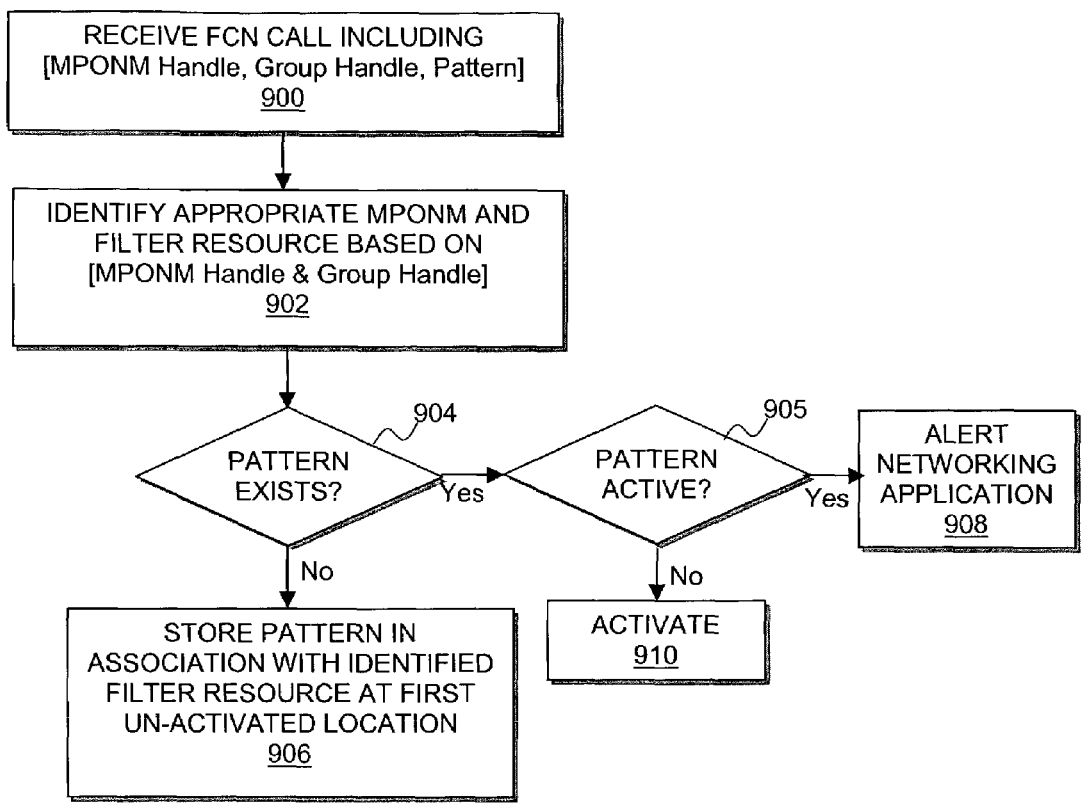
FIG. 9a illustrates an MPONM API operational flow for adding pattern entries to a packet filtering group in accordance with one embodiment of the invention.

FIG. 9a illustrates an MPONM API operational flow for adding pattern entries to a packet filtering group in accordance with one embodiment of the invention. For the illustrated embodiment the process begins with the MPONM API receiving a function call including a first handle previously returned by the MPONM API identifying a particular MPONM, a second handle previously returned by the MPONM API identifying a particular packet filtering group, and a 'pattern' parameter identifying a bit pattern against which ingress packets are compared (block 900). Next, the MPONM and filter resource implicitly identified by the first and second handles, respectively, are identified by the MPONM API (block 902). The MPONM API then determines whether the pattern entry to be stored already exists in the identified resource (block 904). If a duplicate entry exists, a determination is made as to whether the pattern is active (block 905). If the pattern is not active, the entry is activated (e.g. by updating a status bit) (block 910). However, if the pattern entry to be stored is active, the networking application is alerted as to this condition at block 908. If, however, at block 904 the determination is made that the pattern entry to be stored does not exist in the identified resource, the pattern entry is stored in an empty location within the filtering resource (block 906). Accordingly, an MPONM API function call designed to add search patterns to groups might be formed as "AddEntry (thisMpm, gnum, pattern)".

Figure 9B:
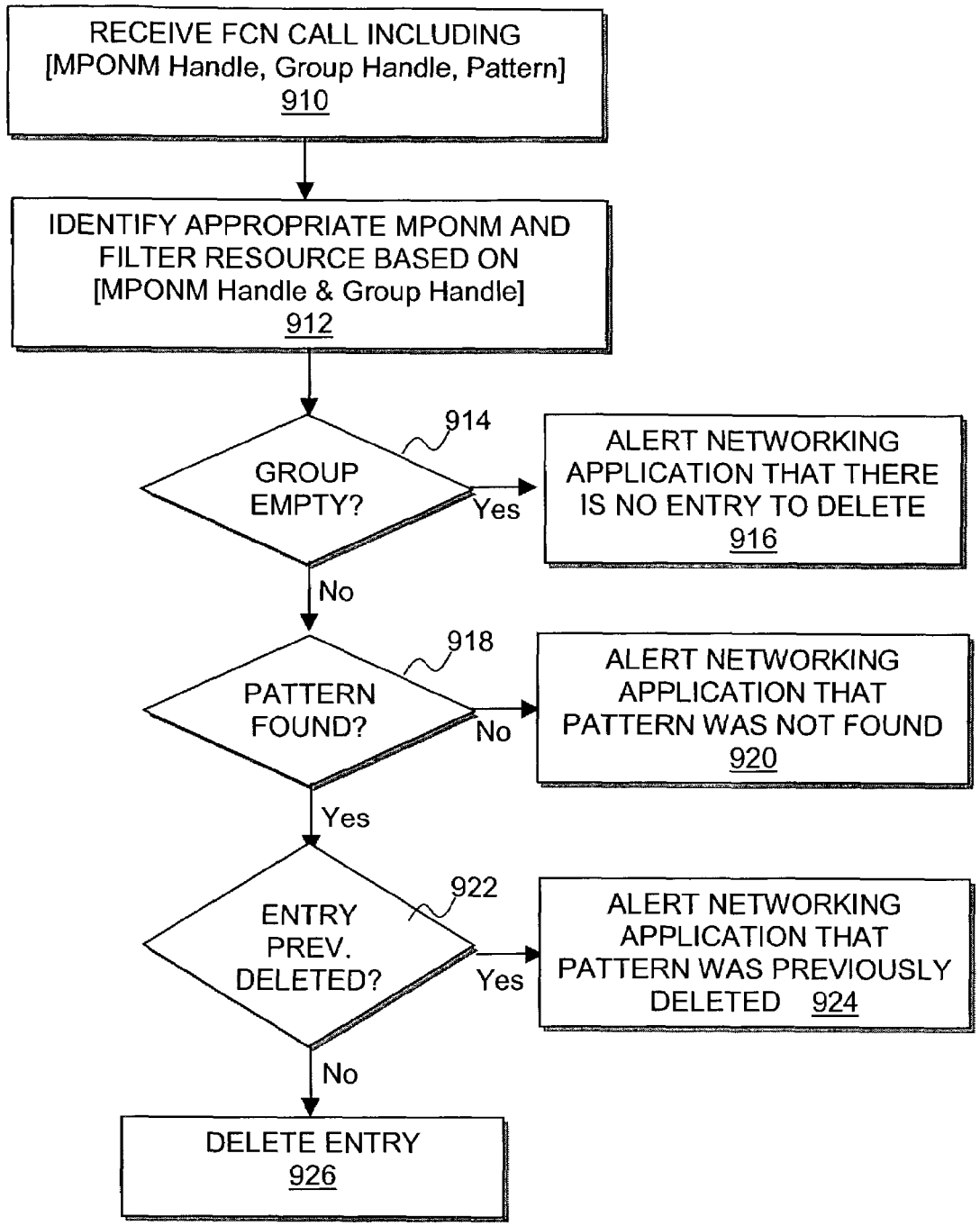
FIG. 9b illustrates an MPONM API operational flow for deleting pattern entries from a packet filtering group in accordance with one embodiment of the invention.

FIG. 9b illustrates an MPONM API operational flow for deleting pattern entries from a packet filtering group in accordance with one embodiment of the invention. For the illustrated embodiment the process begins with the MPONM API receiving a function call including a first handle previously returned by the MPONM API identifying a particular MPONM, a second handle previously returned by the MPONM API identifying a particular packet filtering group, and a 'pattern' parameter identifying a bit pattern to be deleted (block 910). Next, the MPONM and filter resource implicitly identified by the first (e.g. MPONM) and second (e.g. Group) handles, respectively, are identified by the MPONM API (block 912). If at block 914, a determination is made that the group (e.g. implicitly identified by the second handle) does not contain any entries, the networking application is alerted that there are no entries to delete (block 916). If, however, there are entries to be deleted but the pattern cannot be located (block 918), the networking application is alerted accordingly (block 920). However, if the group is not empty and the pattern is located, a determination is made as to whether the pattern has been previously deleted (e.g. as reflected by one or more status bits) (block 922). If so, the application is alerted accordingly (block 924). If the pattern has not been previously deleted, the MPONM API proceeds to delete the entry (e.g. through the setting or clearing of one or more corresponding bits) (block 926).

Rule Creation

In accordance with one embodiment of the invention, rules are used to allow pass, divert, or drop actions to be applied to ingress packets. The pass action allows a packet to pass through to a system interface, the divert action causes a packet to be sent to a diversion FIFO where it can be read by the networking application through e.g. a control interface via the MPONM API, and the drop action causes the packet to be dropped by the networking apparatus. In one embodiment, up to seven prioritized rules in addition to a default rule may be created at any one time, with each prioritized rule being designated by a unique priority. In one embodiment, if multiple rules have been created, the action taken by the packet filter is determined by the highest-priority rule that evaluates to true. If no rules evaluate to true, the default rule determines the disposition of the packet.

Figure 10:
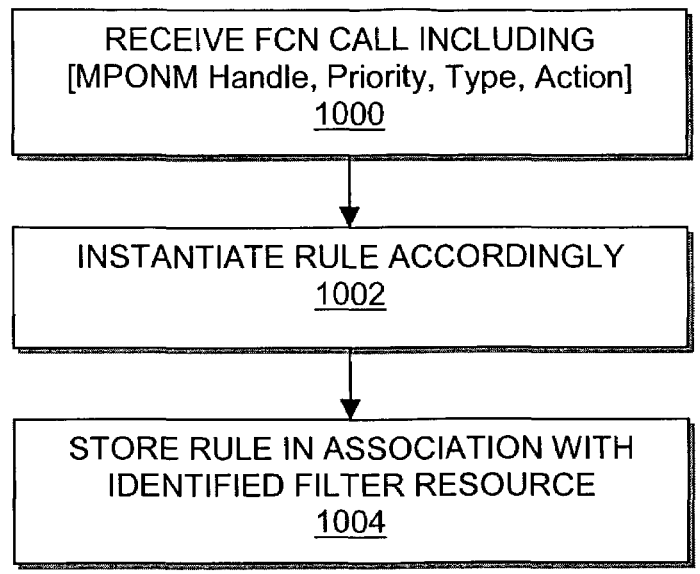
FIG. 10 illustrates an MPONM API operational flow for creating a packet filtering rule in accordance with one embodiment of the invention.

FIG. 10 illustrates an MPONM API operational flow for creating a packet filtering rule in accordance with one embodiment of the invention. In the illustrated embodiment, the process begins with the MPONM API receiving a function call including a handle implicitly identifying an MPONM, in addition to 'priority', 'Type', and 'Action' parameters (block 1000). The priority parameter identifies the priority level to be assigned to the rule. In one embodiment, eligible priorities include lowest, low, medlow, med, medhigh, high, and highest. The 'type' parameter represents the rule operation definition which, in the present embodiment, incorporates AND/OR and NOT rules. The action parameter identifies the resulting action to be taken (e.g. pass, drop, divert) if the rule evaluates to true. The rule is then instantiated according to the arguments provided with the function call (block 1002), and stored in association with the data structure corresponding to the identified filter resource (block 1004). Accordingly, an MPONM API function call designed to create a packet filtering rule of medium priority that will perform and AND function on groups, and will result in the action of pass might be formed as "CreateRule (thisMpm, PF_MEDIUM, PF_AND-FILT, PF_PASS)".

Default Rule

The default rule specifies an action to be taken if an incoming packet does not match any of the prioritized rules (i.e. they all evaluate to false). In one embodiment, the default rule is set through a separate MPONM API function call (the operational flow of which is similar to that of FIG. 10) that includes as parameters a handle implicitly identifying an MPONM containing the filter being configured, in addition to a default result (e.g. pass, drop, divert) to be assigned to the rule. For example, an MPONM API function call designed to create a default rule associated with a "drop" action might be formed as DefaultRuleSet (thisMpm, PF_DROP).

Additionally, a previously created packet filtering rule may be deleted by the MPONM API by way of a DeleteRule function. The default rule may not be deleted but may be changed with the DefaultRuleSet function. In one embodiment, the DeleteRule function takes as parameters the module handle and the priority assigned to the rule to be deleted.

Adding Groups to Rules

In accordance with one embodiment of the invention, the presence or absence of a match in a group can be used as a Boolean condition in each rule. When each rule is created, it is designated as an AND, OR, NAND, or NOR rule. This Boolean operator is applied to all groups that have been added to the rule. For example, if group A, group B, and group C denote groups that have been added to an OR rule with normal polarity, the rule will be true if (group A|group B|group C) evaluates to true (i.e. a match exists within at least one of these groups).

Figure 11:
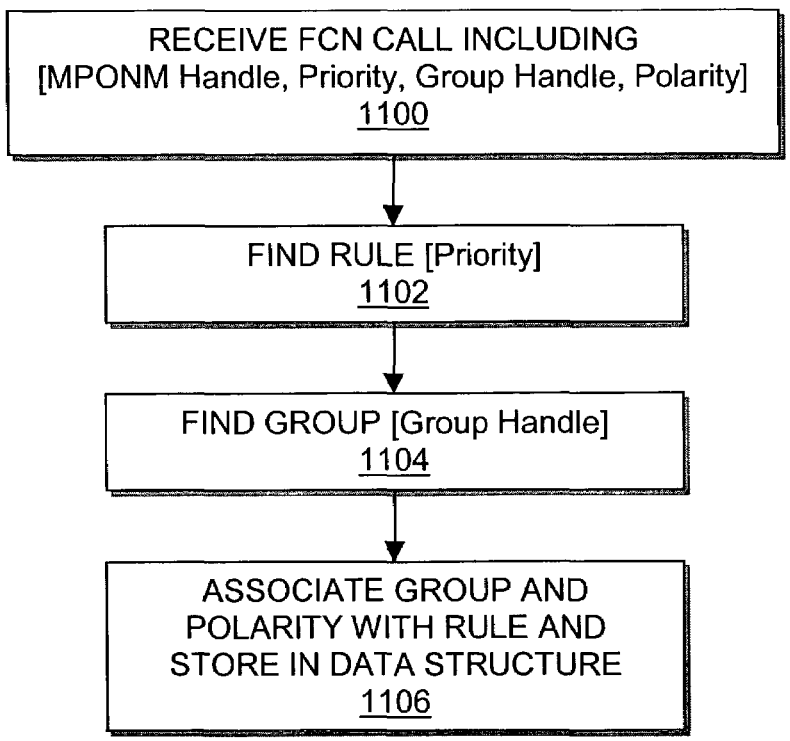
FIG. 11 illustrates an MPONM API operational flow for adding groups to packet filtering rules in accordance with one embodiment of the invention.

FIG. 11 illustrates an MPONM API operational flow for adding groups to packet filtering rules in accordance with one embodiment of the invention. As illustrated, the process begins with the MPONM API receiving a function call including a first handle implicitly identifying a MPONM, the rule to use (e.g. identified by its priority), a second handle implicitly identifying the group that will be added, and a polarity (block 1100). In one embodiment, the polarity of the group is either NORMAL or INVERTED, where NORMAL corresponds to inclusion in the group being considered as a "true" input into the rule, while INVERTED corresponds to exclusion in the group being considered as a "true" input into the rule. At block 1102, the MPONM API identifies the rule based upon its priority, and at block 1104, the MPONM API identifies the group based upon its associated handle previously returned by the MPONM API. Lastly, the MPONM API associates the group and polarity with the rule, and stored in association with the MPONM data structure (block 1106).

In addition to including a function to add a group to a rule, the MPONM API further includes a function to delete a group from a rule. In one embodiment, the DelGrpFromRule function takes as parameters the module handle, the rule involved (e.g. given by its priority), and the handle of the group to be deleted from the indicated rule. In one embodiment, this function may be called repeatedly in order to delete more than one group from a previously created rule.

Accessor Functions

In addition to the various packet filter configuration functions described above, the MPONM API further includes various accessor functions designed to extract the state of the packet filter. In one embodiment, these accessor functions iterate through active groups, iterate through an active group's entries, extract the pattern of the group's entry, extract group parameters, iterate through active rules, extract rule parameters, iterate through a rule's entries, extract the parameters of the group handle associated with a rule, obtain an action associated with the default rule, obtain the number of entries that exist within a group, determine if a group handle is valid, and so forth.

Example Packet Filter Data Associations

Figure 12A:
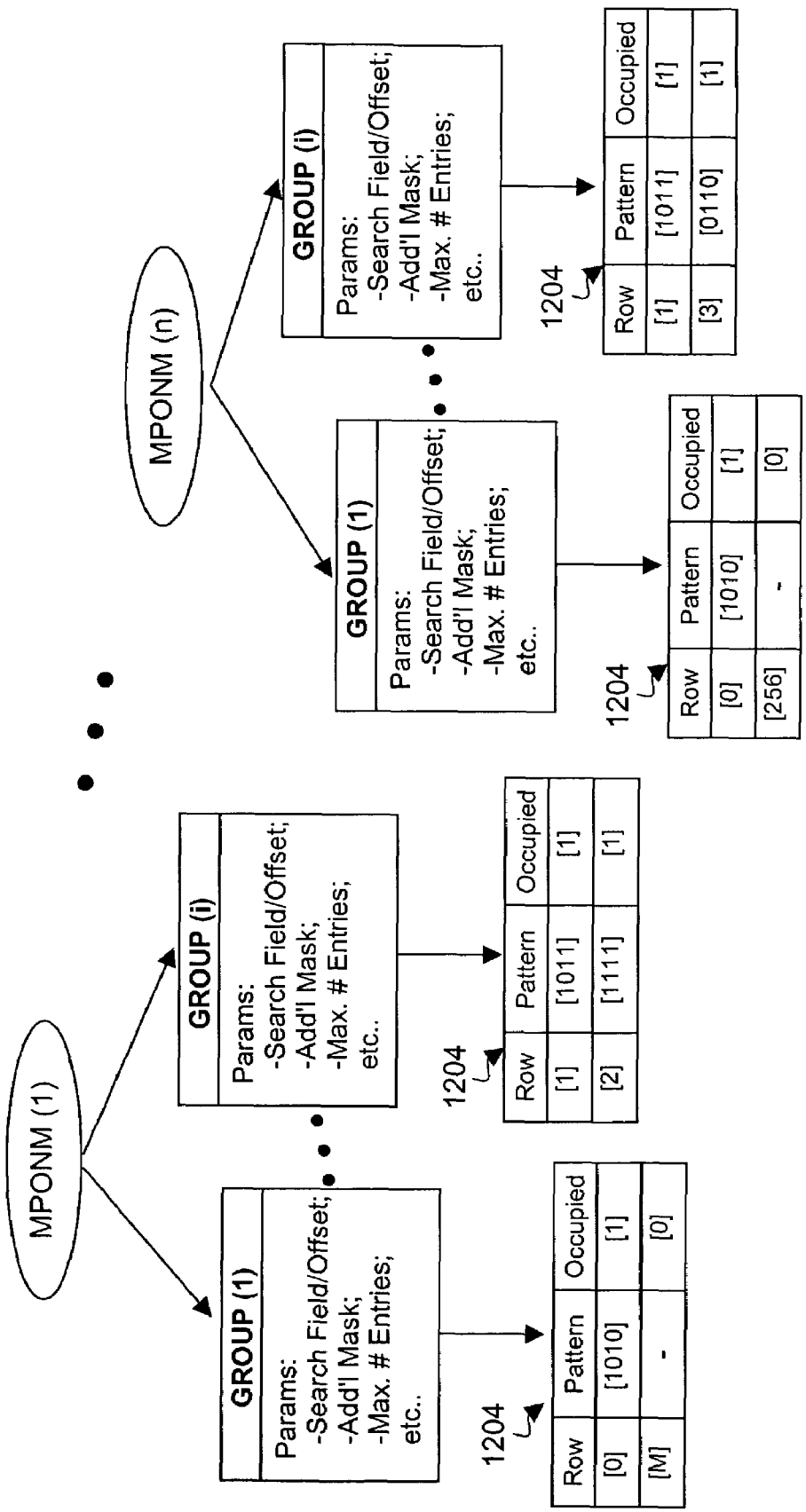
FIGS. 12a-b represents various data associations used by the MPONM API, in accordance with one embodiment of the invention, to configure various packet filtering resources on various MPONMs.
Figure 12B:
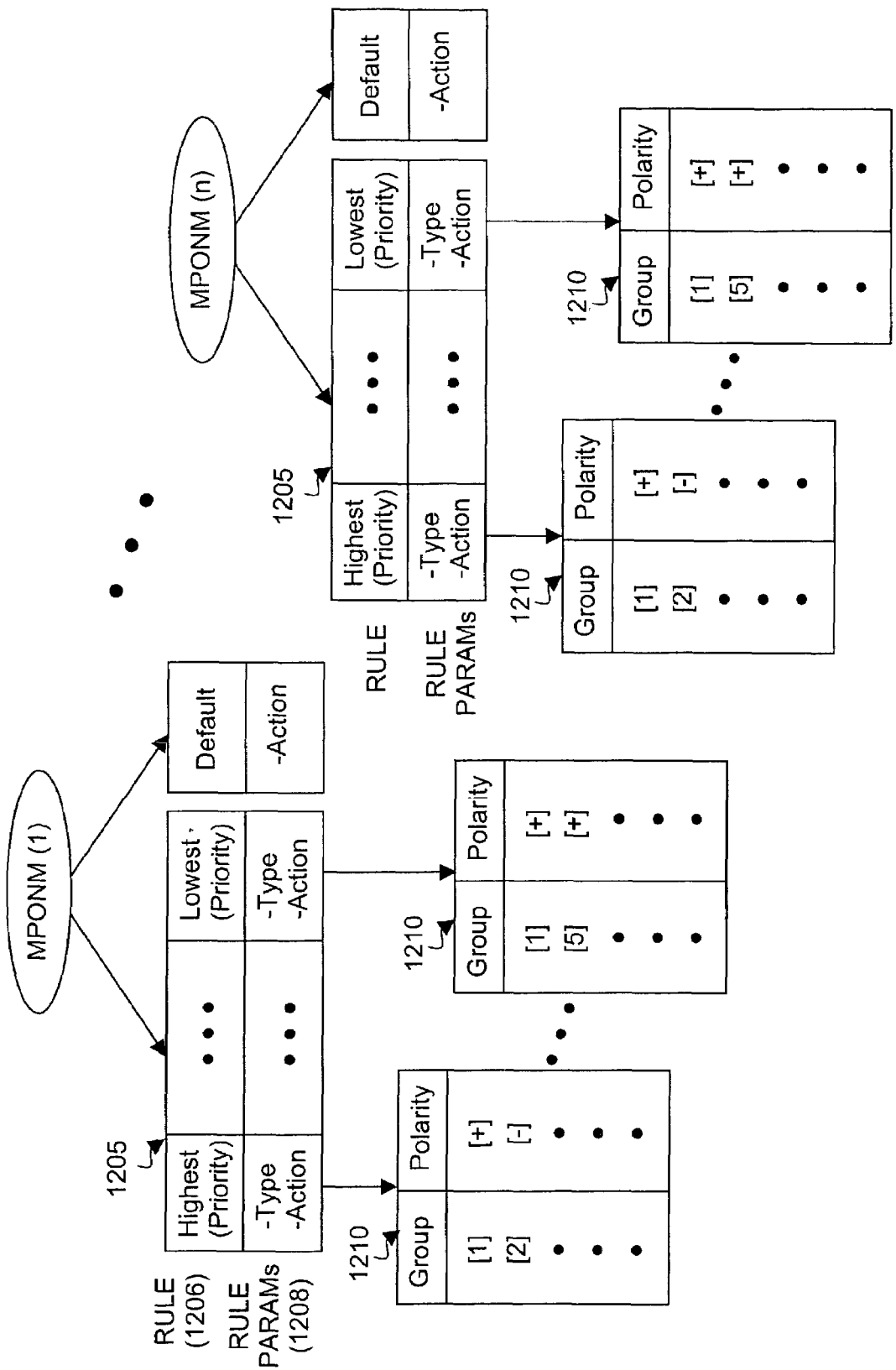

FIGS. 12a-b represents various data associations used by the MPONM API, in accordance with one embodiment of the invention, to configure various packet filtering resources on various MPONMs. In particular, FIG. 12a illustrates one embodiment of a relational data structure for managing associations between groups, parameters/attributes associated with the group, and any pattern entries associated with a group. As shown, each MPONM can include multiple packet filter groups with each group containing one or more pattern entries. Table 1204 is used to identify the rows of a given filtering resource that are empty but have been initialized as previously described, the rows that are occupied with previously stored pattern entries, in addition to the stored pattern entries. In one embodiment, table 1204 is dynamically updated by the MPONM API as pattern entries are stored and deleted over the course of time.

FIG. 12b illustrates one embodiment of a data structure used e.g. by the MPONM API to identify and manage rule/group associations of various packet filtering resources on various MPONMs. As shown, each MPONM is associated with a first rule table (1205) that associates each rule (1206) with one or more rule parameters (1208). In the illustrated embodiment, rule table 1205 associates each of 7 rules, ranging from the "highest" priority to the "lowest" priority, with a type (e.g. AND, OR, NOR, NAND) and an action (e.g. drop, divert pass). Furthermore, each rule (as indicated by a priority) is further associated with a group table (1210). Group table 1210 in turn associates each group (e.g. typically given by group handle) with a polarity (e.g. whether to perform the associated action upon a comparison evaluating to TRUE (a match) or FALSE (a miss)).

Conclusion and Epilogue

Thus, it can be seen from the above descriptions, a novel highly flexible MPONM API equipped to streamline and improve the ease of network applications in accessing, controlling or otherwise interacting with function block of multi-protocol network processors of MPONM has been described. While the present invention has been described in terms of the above-described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
a networking application requesting an externalized initialization function of an application programming interface (API) to perform an initialization to enable a first of a plurality of multi-protocol optical networking modules (MPONM) of a networking apparatus to subsequently perform filtering operations for the networking application, the API having the externalized initialization function and at least one other externalized operation function, and each of the MPONM having a plurality of resources that can be selectively employed to selectively perform filtering operations for networking communications of a plurality of networking communication protocols, the initialization request implicitly identifying a first MPONM to the API by providing a handle of a device driver for interfacing with the first MPONM; and
the API, in response, returning to the networking application a handle of a data structure instance for subsequent use by the networking application to implicitly request the first MPONM to perform filtering operations on networking communications of one or more communication protocols by requesting the API and referencing the data structure instance using the handle, the data structure instance being associated with the first MPONM and having plural sets of data elements, each set being associated with a communication protocol, wherein the API to create the data structure instance if the networking application's initialization request is a first initialization request associated with the first MPONM subsequent to a power up or reset of the networking apparatus.

2. The method of claim 1 further comprising the networking application subsequently requesting the first MPONM to perform filtering operations on networking communications of a communication protocol by requesting an operation function of the MPONM API, including with the request to the operation function of the API the handle of the data structure instance implicitly identifying the first MPONM.

3. The method of claim 2 wherein the operation function of the API is particularized for configuring filtering resource associated with filtering operations for networking communication of the communication protocol, and the requesting of the operation function of the API, in conjunction with the provision of the handle of the data structure instance associated with the first MPONM, implicitly selecting the corresponding filtering resource of the first MPONM to perform the filtering operations on networking communication of the communication protocol requested of the first MPONM.

4. The method of claim 3 further comprising the networking application, prior to requesting the operation function of the API, storing a plurality of configuration parameter values in data elements of the data structure instance corresponding to filtering operations for networking communications of the communication protocol to configure corresponding filtering resource of the first MPONM.

5. The method of claim 4, wherein said storing comprises the networking application storing relative priorities of filtering rules into selected data elements of the data structure instance.

6. The method of claim 4, wherein said storing comprises the networking application storing a bit pattern to compare ingress packets against, into selected data elements of the data structure instance.

7. The method of claim 3 further comprising the networking application subsequently requesting the first MPONM to perform filtering operations on networking communications of another communication protocol by requesting another operation function of the MPONM API, including with the request to the other operation function of the API the handle of the data structure instance implicitly identifying the first MPONM, the other operation function of the API being particularized for configuring filtering resource associated with filtering operations for networking communication of the other communication protocol.

8. The method of claim 2, wherein the operation function of the API is particularized for configuring filtering resource for filtering operations on networking communication of a plurality of communication protocols, and the method further comprises the networking application including with the request of the operation function of the API identification of the filtering resource of the first MPONM to be employed to perform the requested filtering operations on networking communication of the communication protocol, the first MPONM being implicitly identified by the provision of the handle of the data structure instance.

9. The method of claim 1 wherein the networking application and the API operates on the networking apparatus.

10. The method of claim 1 further comprising the networking application making another request of the initialization function to initialize a second of the plurality of MPONM of the networking apparatus to subsequently perform filtering operations for the networking application, the other initialization request implicitly identifying the second MPONM; and the API, in response, returning to the networking application another handle of another data structure instance for subsequent use by the networking application to implicitly request the second MPONM to perform filtering operations on networking communication of one or more communication protocols by requesting the API and referencing the other data structure instance using the other handle, the other data structure instance being associated with the second MPONM.

11. The method of claim 1 further comprising another networking application making another request of the initialization function to initialize the first MPONM to subsequently perform filtering operations for the networking application, the other initialization request implicitly identifying the first MPONM; and the API, in response, returning to the networking application the handle of the data structure instance for subsequent use by the other networking application to implicitly request the first MPONM to perform filtering operations on networking communication of one or more communication protocols by requesting the API and referencing the data structure instance using the handle.

12. The method of claim 1 further comprising another networking application making another request of the initialization function to initialize a second of the plurality of MPONM of the networking apparatus to subsequently perform filtering operations for the other networking application, the other initialization request implicitly identifying the second MPONM; and the API, in response, returning to the networking application another handle of another data structure instance for subsequent use by the other networking application to implicitly request the second MPONM to perform filtering operations on networking communication of one or more communication protocols by requesting the API and referencing the other data structure instance using the other handle, the other data structure instance being associated with the second MPONM.

13. An article of manufacture comprising:
a computer readable storage medium; and
a plurality of programming instructions stored in the storage medium, configured to implement an application programming interface (API) on a networking apparatus with a plurality of multi-protocol optical networking modules (MPONM), the API including an externalized initialization function and a plurality externalized operation functions, the initialization function configured to receive an initialization request from a networking application, and in response, returning a handle associated with a data structure instance to the networking application;
wherein the initialization request requests the initialization function to perform an initialization to enable a first of the MPONM to subsequently perform filtering operations for the networking application, each of the MPONM having a plurality of resources that can be selectively employed to selectively perform filtering operations for networking communications of a plurality of networking communication protocols;
wherein the initialization request implicitly identifies the first MPONM; and the data structure instance is associated with the first MPONM and configured for subsequent use by the networking application to implicitly request the first MPONM to perform filtering operations on networking communications of one or more communication protocols by requesting the API and referencing the data structure instance using the handle, wherein the initialization function is configured to create the data structure instance if the initialization request is a first initialization request associated with the first MPONM subsequent to a power up or reset of the networking apparatus.

14. The article of claim 13, wherein the API further comprises an operation function configured to facilitate the networking application to subsequently request the first MPONM to perform filtering operations on networking communications of a communication protocol by requesting the operation function, including with the request the handle of the data structure instance implicitly identifying the first MPONM.

15. The article of claim 13, wherein the operation function of the API is particularized for configuring filtering resource associated with filtering operations for networking communication of the communication protocol, and the requesting of the operation function, in conjunction with the provision of the handle of the data structure instance associated with the first MPONM, implicitly selecting the corresponding filtering resource of the first MPONM to perform the filtering operations on networking communication of the communication protocol requested of the first MPONM.

16. An apparatus comprising:
a plurality of multi-protocol optical networking modules (MPONM), each of the MPONM's including at least one network processor and having a plurality of resources, wherein different subsets of the resources can be selectively employed to selectively perform filtering operations for networking communications of a plurality of networking communication protocols; and
a plurality of functions configured to facilitate networking applications to implicitly configure and select the subsets to selectively perform filtering operations on networking communications of a plurality of communication protocols for the networking applications, wherein the functions include an initialization function configured to receive initialization requests from the networking applications, each initialization request requesting the initialization function to perform an initialization to enable a selected one of the MPONM's to subsequently perform filtering operations for the networking application, the initialization request implicitly identifying a selected MPONM to an API by providing a handle of a device driver for interfacing with the selected MPONM, the handle of the device driver being a handle of a data structure instance created by the API if the networking application's initialization request is a first initialization request associated with the selected MPONM subsequent to a power up or reset of the apparatus.

17. The apparatus of claim 16, wherein the initialization function is configured to respond to each initialization request, returning a handle associated with a data structure instance to the requesting networking application, the data structure instance being associated with the selected MPONM and configured for subsequent use by the networking application to implicitly request the selected MPONM to perform filtering operations on networking communication of one or more communication protocols by requesting the API and referencing the data structure instance using the handle.

18. The apparatus of claim 16, wherein the functions include an operation function configured to enable the networking applications to selectively request the MPONM to perform filtering operations on networking communications of a plurality communication protocol by requesting the operation function, including with each request a handle of a data structure instance implicitly identifying one of the MPONM.

19. The apparatus of claim 18, wherein the operation function is particularized for configuring filtering resource associated with filtering operations for networking communication of a communication protocol, and the requesting of the operation function, in conjunction with the provision of a handle of a data structure instance associated with a selected MPONM, implicitly selecting the corresponding filtering resource of the selected MPONM to perform the filtering operations on networking communication of the communication protocol requested of the selected MPONM.

20. The apparatus of claim 16, wherein the resources of each MPONM comprises two or more of a media access control (MAC) block, an Ethernet 64/64 coder, an Ethernet on SONET coder block, a Point to Point Protocol and High-Level Data Link Control (HDLC) processor block, a HDLC packet over SONET coder block, a SONET path processor block, a SONET section and line processor block, and a packet filtering block.

* * * * *